(12) United States Patent
Romanov et al.

(10) Patent No.: US 9,926,799 B2
(45) Date of Patent: Mar. 27, 2018

(54) GAS TURBINE ENGINE COMPONENTS, BLADE OUTER AIR SEAL ASSEMBLIES, AND BLADE OUTER AIR SEAL SEGMENTS THEREOF

(71) Applicant: United Technologies Corporation, Hartford, CT (US)

(72) Inventors: Dmitriy A. Romanov, Wells, ME (US); Dominic J. Mongillo, Jr., West Hartford, CT (US); Paul M. Lutjen, Kennebunkport, ME (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 343 days.

(21) Appl. No.: 14/881,047

(22) Filed: Oct. 12, 2015

(65) Prior Publication Data
US 2017/0101881 A1 Apr. 13, 2017

(51) Int. Cl.
| | |
|---|---|
| *F01D 11/08* | (2006.01) |
| *F01D 25/12* | (2006.01) |
| *F01D 5/18* | (2006.01) |
| *F01D 9/02* | (2006.01) |

(52) U.S. Cl.
CPC .............. *F01D 11/08* (2013.01); *F01D 5/187* (2013.01); *F01D 9/023* (2013.01); *F01D 25/12* (2013.01); *F05D 2220/32* (2013.01); *F05D 2260/22141* (2013.01)

(58) Field of Classification Search
CPC .......... F01D 11/08; F01D 5/187; F01D 9/023; F01D 25/12; F05D 2220/32; F05D 2260/22141
See application file for complete search history.

(56) References Cited

U.S. PATENT DOCUMENTS

| | | | |
|---|---|---|---|
| 7,517,189 B2 * | 4/2009 | Camus | ............ F01D 9/04 415/173.1 |
| 7,874,792 B2 | 1/2011 | Tholen et al. | |
| 8,128,349 B2 | 3/2012 | Lutjen et al. | |
| 8,177,492 B2 * | 5/2012 | Knapp | ............ F01D 5/18 415/173.1 |
| 2013/0340966 A1 | 12/2013 | Tholen et al. | |

* cited by examiner

*Primary Examiner* — Richard Edgar
(74) *Attorney, Agent, or Firm* — Snell & Wilmer L.L.P.

(57) ABSTRACT

A gas turbine engine component is provided. The gas turbine engine component has an internal cooling passage having first endwall and a second endwall. A primary inlet aperture is in fluid communication with a coolant supply and the first end of the internal cooling passage. An elongated rib is inside the internal cooling passage and proximate the primary inlet aperture. The elongated rib is configured to direct at least a portion of the coolant from the primary inlet aperture against a proximate one of the first or second endwall and then substantially reverse direction to flow downstream toward a second end of the internal cooling passage. A blade outer air seal ("BOAS") assembly and a BOAS segment thereof are also provided.

18 Claims, 9 Drawing Sheets

GAS TURBINE ENGINE COMPONENTS, BLADE OUTER AIR SEAL ASSEMBLIES, AND BLADE OUTER AIR SEAL SEGMENTS THEREOF

GOVERNMENT LICENSE RIGHTS

The present disclosure was made with government support under FA 8650-09-D-29230021 awarded by The United States Air Force. The government has certain rights in the disclosure.

FIELD

The present disclosure relates to gas turbine engines, and more specifically, to a gas turbine engine component, a blade outer air seal ("BOAS") assembly, and a BOAS segment thereof.

BACKGROUND

A gas turbine engine typically includes a fan, a compressor, a combustor, a turbine, and an exhaust nozzle. During engine operation, working medium gases are drawn into and compressed in the compressor. The compressed air is channeled to the combustor where fuel is added to the air and the air/fuel mixture is ignited. The products of combustion are discharged to the turbine section, which extracts work from these products to produce useful thrust to power, for example, an aircraft in flight.

The compressor and turbine commonly include alternating stages of rotor blades and stator vanes. Compressor and turbine rotors include stationary annular fluid seals surrounding the rotor blades and acting to contain and direct the flow of working medium gases through successive stages. Compressor and turbine rotor seals (the stationary annular fluid seals), sometimes referred to as outer air seals (e.g., a blade outer air seal ("BOAS") assembly for a gas turbine engine rotor assembly), may include arcuate BOAS segments circumferentially arranged to form a ring about the engine axis radially outward of the rotor blades. The BOAS assembly including the ring of arcuate BOAS segments may be attached to the engine case by, for example, one or more support rings. Circumferentially adjacent BOAS segments may be adjoined at axial inter-segment surfaces by shiplap joints with and without feather seals.

SUMMARY

A gas turbine engine component is provided according to various embodiments. The gas turbine engine component has an internal cooling passage having a first endwall and a second endwall. A primary inlet aperture is in fluid communication with a coolant supply and a first end of the internal cooling passage. An elongated rib is inside the internal cooling passage and proximate the primary inlet aperture. The elongated rib is configured to direct at least a portion of the coolant from the primary inlet aperture against a proximate one of the first endwall or the second endwall and then substantially reverse direction to flow downstream toward a second end of the internal cooling passage.

A BOAS segment in a gas turbine engine is provided in accordance with various embodiments. The BOAS segment comprises a coolant supply surface configured to be in fluid communication with a coolant supply and a seal surface configured to be in fluid communication with a working medium fluid flow and arranged radially outward of a plurality of turbine blades. A first inter-segment surface extends between the coolant supply surface and the seal surface. A second inter-segment surface is circumferentially offset from the first inter-segment surface and extends between the coolant supply surface and the seal surface. An internal cooling passage between the coolant supply surface and the seal surface extends between the first and the second inter-segment surfaces so as to be tapered. A selected internal cooling passage comprises a primary inlet aperture in fluid communication with the coolant supply and a first end of the selected internal cooling passage. An elongated rib is inside the internal cooling passage and proximate the primary inlet aperture. The elongated rib is configured to direct at least a portion of the coolant from the primary inlet aperture against the proximate one of the first endwall or the second endwall and then substantially reverse direction to flow downstream toward a second end of the internal cooling passage.

A blade outer air seal (BOAS) assembly is provided according to various embodiments. The BOAS assembly comprises a plurality of circumferentially extending and adjoined BOAS segments. Each BOAS segment comprises a first inter-segment surface and a second inter-segment surface connecting an outer diameter face and an inner diameter face and a plurality of internal cooling passages extending between the first inter-segment surface and the second inter-segment surface and between the outer diameter face and the inner diameter face. Each internal cooling passage has a first endwall and a second endwall. At least one internal cooling passage of the plurality of internal cooling passages comprises a primary inlet aperture in fluid communication with a coolant supply and a first end of the at least internal cooling passage. The elongated rib is proximate the primary inlet aperture and is configured to direct at least a portion of the coolant from the inlet aperture against the proximate one of the first endwall or the second endwall and then substantially reverse direction to flow downstream toward a second end of the at least one internal cooling passage.

In any of the foregoing embodiments, the internal cooling passage comprises a first sidewall and a second sidewall and the first endwall and the second endwall connect the first sidewall and the second sidewall. The elongated rib is connected to and partially extends from at least one of the first sidewall or the second sidewall toward another of the first sidewall or the second sidewall. The elongated rib is isolated inside the internal cooling passage. The elongated rib comprises at least one of a generally L-shaped rib, a generally T-shaped rib, a generally Y-shaped rib, a generally U-shaped rib, or a shepherd's hook-shaped rib. The elongated rib overshadows a downstream portion of the internal cooling passage. The downstream portion of the internal cooling passage overshadowed by the elongated rib includes at least one secondary inlet aperture in fluid communication with the coolant supply and the internal cooling passage. The elongated rib is arranged between the primary inlet aperture and a secondary inlet aperture of the at least one secondary inlet aperture. The internal cooling passage further comprises one or more heat transfer enhancement features. The elongated rib at least partially segregates the internal cooling passage into two or more cooling passages that communicate at one or more streamwise pressure locations. A shape of the primary inlet aperture and the at least one secondary inlet aperture is configured to meet a convective heat transfer requirement, a size of the primary inlet aperture is configured to provide a predetermined flow rate and convective heat transfer rate within the internal cooling passage, and a first radii (R1) and a second radii (R2) size of the elongated rib is configured to minimize flow separation in the internal cooling passage and to accommodate a shape and a size of the primary inlet aperture and the at least one secondary inlet aperture. The elongated rib comprises at least one of a linear rib, a curvilinear rib, a bowed rib, or a rib having multiple inflections. A streamwise length (L) of the elongated rib comprising a shepherd's hook-shaped rib comprises a minimum of at least three times a hydraulic diameter of the larger of two adjacent cooling passages of the two or more cooling passages.

Figure 1:
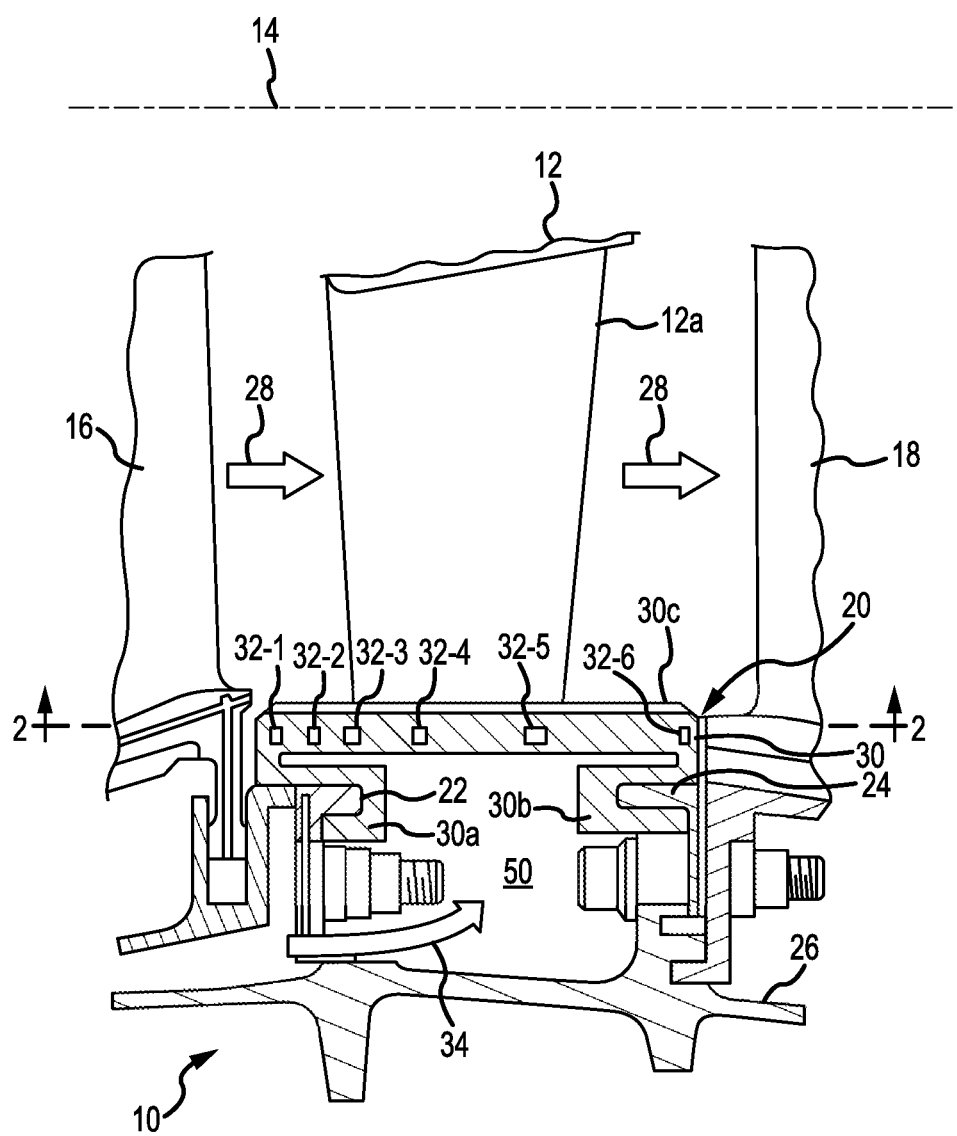
FIG. 1 is a partial axial sectional view of a gas turbine engine rotor and case assembly including a blade outer air seal ("BOAS") assembly, according to various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this inventions and the teachings herein. Thus, the detailed description herein is presented for purposes of illustration only and not of limitation. The scope of the inventions is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Furthermore, any reference to singular includes plural embodiments, and any reference to more than one component or step may include a singular embodiment or step.

Various embodiments are directed to gas turbine engine components, blade outer air seal (BOAS) assemblies, and BOAS segments thereof Various embodiments include an elongated rib inside selected convectively-cooled internal cooling passages thereof, the elongated rib providing improved cooling of the gas turbine engine component, BOAS assembly, and BOAS segments thereof, tending to increase engine operating efficiency and, in the case of the BOAS assembly, reduce the risk of material failures due to mechanical stress on the rotor seal (i.e., the BOAS assembly). The elongated rib (including the shape and size thereof) is designed to minimize internal flow separation and optimize thermal performance within the selected internal cooling passage. Moreover, costs associated with operating and maintaining a gas turbine engine tend to be reduced.

FIG. 1 is a partial axial sectional view of a gas turbine engine rotor and case assembly 10 including a rotor, such as turbine rotor 12, engine axis of rotation 14, stators 16 and 18, rotor seal (i.e., blade outer air seal (BOAS) assembly 20), supports 22 and 24, and case 26. Turbine rotor 12 may be, for example, a high pressure turbine rotor stage including a circumferential array of blades 12a configured to be connected to and rotate with a rotor disc about engine axis 14. Immediately upstream (forward) and downstream (aft) of turbine rotor 12 are stators 16 and 18, which may be, for example, turbine stators including circumferential arrays of vanes configured to guide working medium fluid 28 flow through successive turbine stages, such as through turbine rotor 12. Circumscribing the tips of blades 12a is the rotor seal (e.g., the BOAS assembly 20). BOAS assembly 20 is connected to engine case 26 by supports 22 and 24. As noted previously, BOAS assembly 20 may include a plurality of arcuate BOAS segments 30 (FIGS. 1 through 3) circumferentially arranged to form an annular ring surrounding the rotor blades 12a. With brief reference to FIGS. 2 and 4, inter-segment surfaces 31a and 31b are axial surfaces of BOAS segment 30 configured to abut a circumferentially adjacent BOAS segment. A rabbet may be formed in each of the first axial inter-segment surface 31a and the second axial inter-segment surface 31b to form a shiplap joint 100 where the rabbets of adjacent BOAS segments 30 overlap as shown in FIG. 4. The BOAS segment may further comprise a feather seal slot edge 102 (FIG. 7) for receiving a feather seal or portion thereof.

Figure 2:
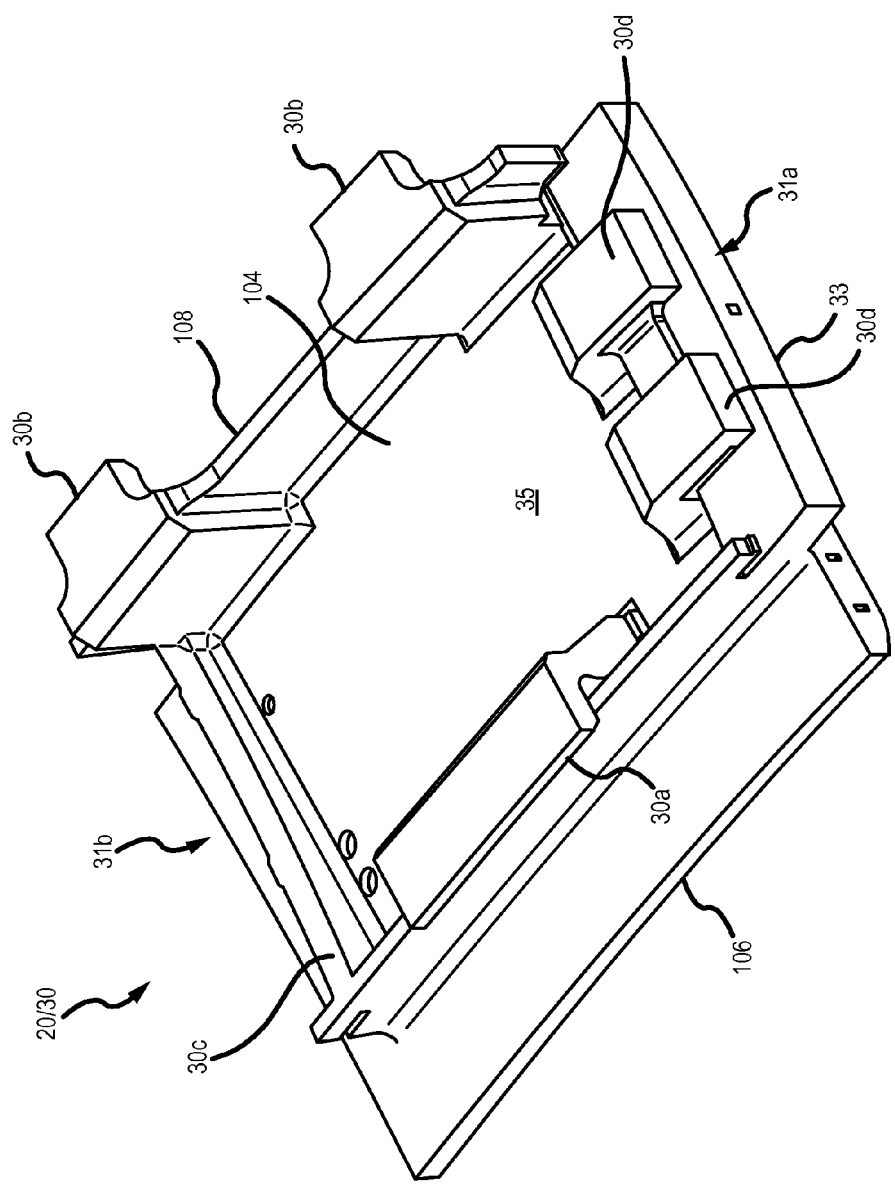
FIG. 2 is a perspective view of a BOAS segment of the BOAS assembly of FIG. 1
Figure 3:
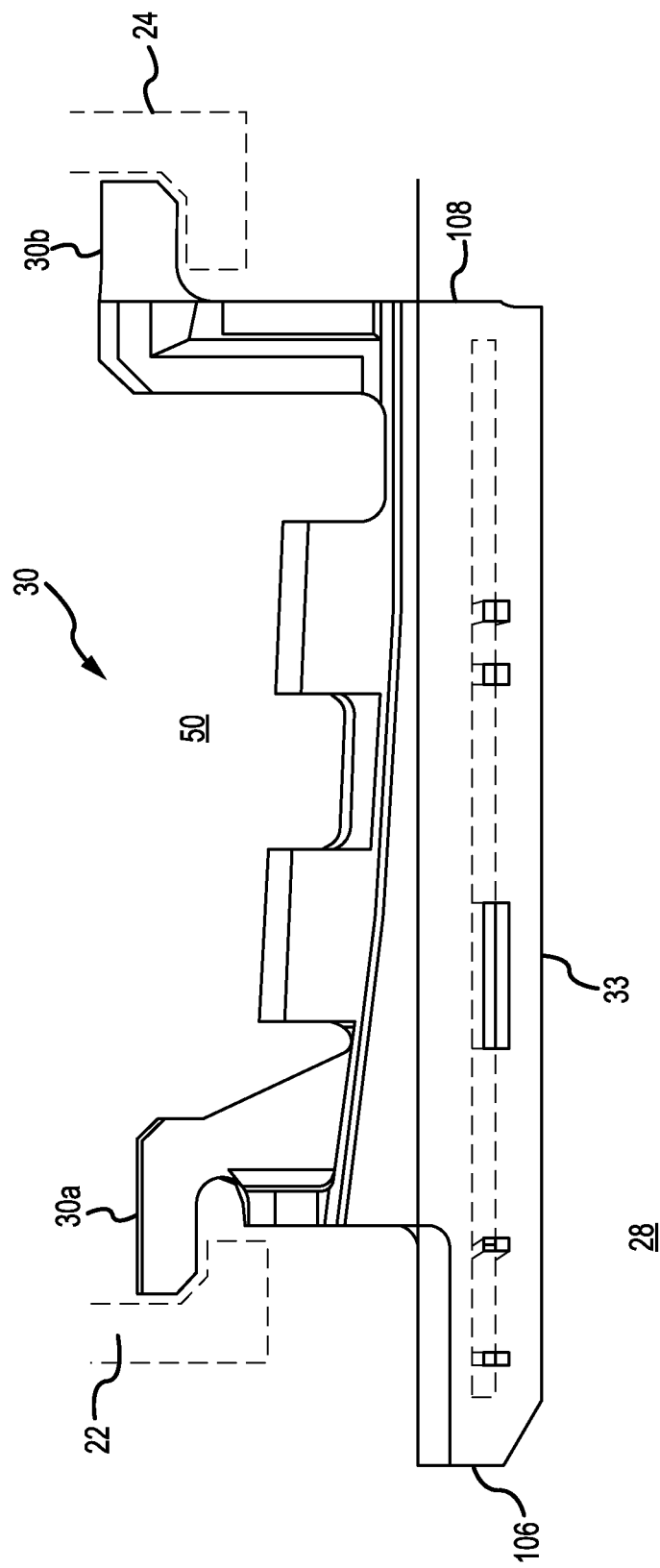
FIG. 3 is a close-up circumferential end view of the BOAS segment of FIG. 2, according to various embodiments.
Figure 4:
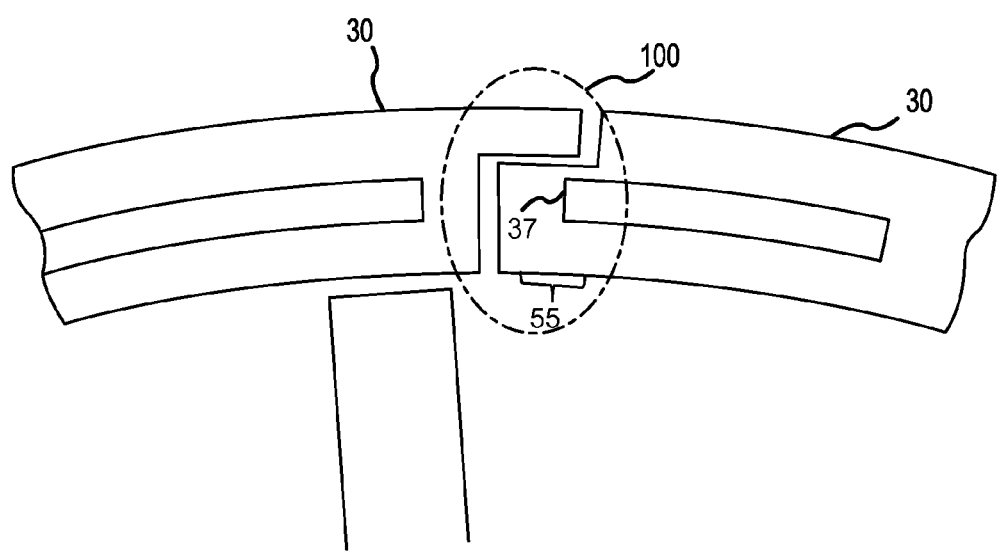
FIG. 4 is a partially cut-away, schematic view of a portion of the BOAS assembly of FIG. 1, illustrating a shiplap joint used to adjoin an adjacent pair of BOAS segments such as illustrated in FIGS. 2 and 3, according to various embodiments.

FIG. 2 is a view of the BOAS segment 30 of the BOAS assembly of FIG. 1 and FIG. 3 is a circumferential end view of the BOAS segment 30 of FIG. 2. The BOAS segment 30 has a main body portion 104 having a leading/upstream/forward end 106 and a trailing/downstream/aft end 108. The main body portion 104 has first and second circumferential ends or matefaces (the first axial inter-segment surface 31a and the second axial inter-segment 31b). The main body portion 104 has an inner diameter (ID) face 33 and an outer diameter (OD) face 35.

To mount the BOAS assembly 20 to the environmental structure of a gas turbine engine rotor and case assembly 10 (FIG. 1), each of the BOAS segments 30 may include, as shown in FIGS. 1 through 3, forward and aft hooks 30a, 30b, configured to mount BOAS segment 30 to supports 22, 24, respectively. While only a single forward hook 30a is shown in FIG. 2, it is to be understood that there may be a greater number of forward hooks 30a along BOAS segment 30. During gas turbine engine operation, the blades 12a rotate about engine axis 14, and the rotor seal (the BOAS assembly 20) acts to contain and direct working medium fluid 28 around the blades 12a. Blades 12a rotate in close proximity with rotor seal (BOAS assembly 20) to minimize the amount of working medium fluid 28 that escapes the primary flow path into the space between the tip of blades 12a and rotor seal (BOAS assembly 20).

Figure 5:
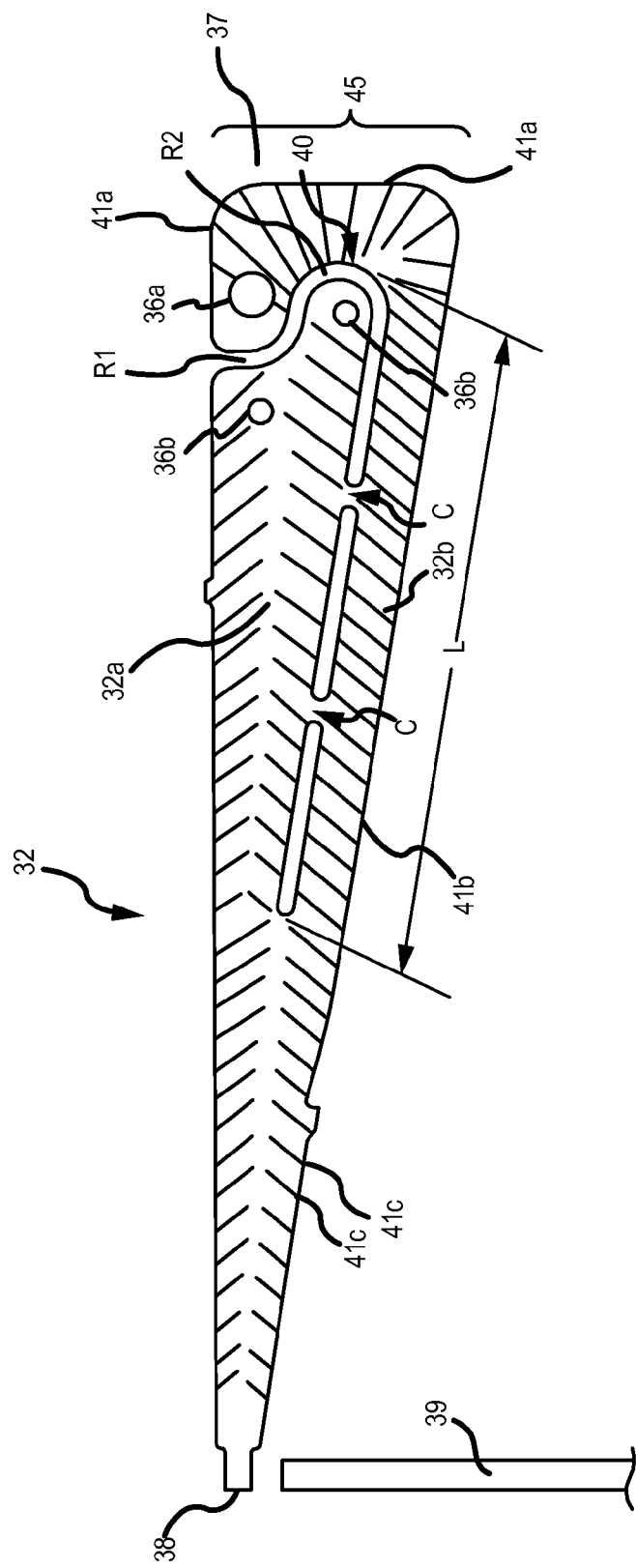
FIG. 5 is a sectional view of an exemplary internal cooling passage of a BOAS segment including an elongated rib in the form of a shepherd's hook, according to various embodiments.
Figure 6:
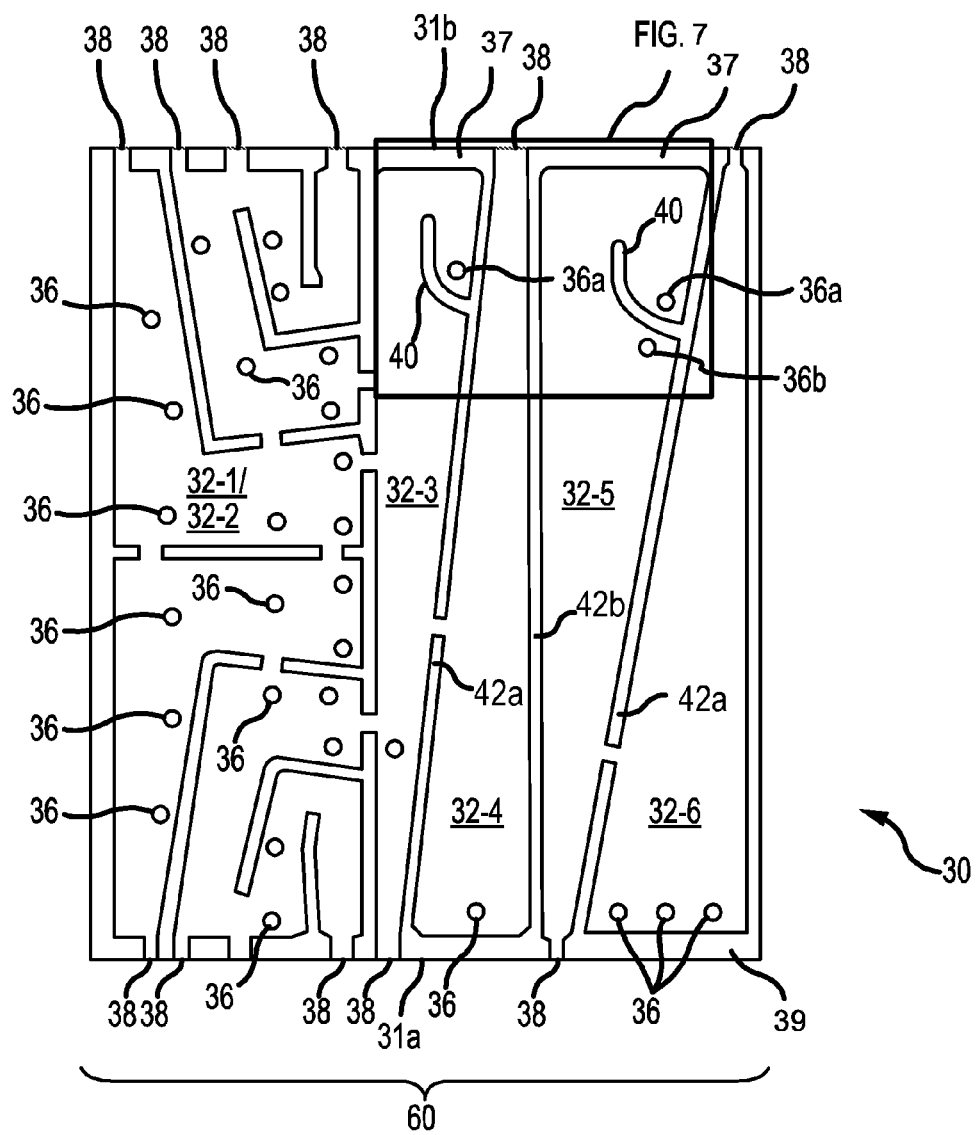
FIG. 6 is a top down (radially inward) view of a portion of the BOAS segment of FIGS. 2 and 3, illustrating a plurality of internal cooling passages (32-1 through 32-6) with selected internal cooling passages (32-3 and 32-5) including an elongated rib of an exemplary shape proximate a primary inlet aperture and internal cooling passage 32-5 further including a secondary inlet aperture in an overshadowed downstream portion thereof, according to various embodiments.
Figure 7:
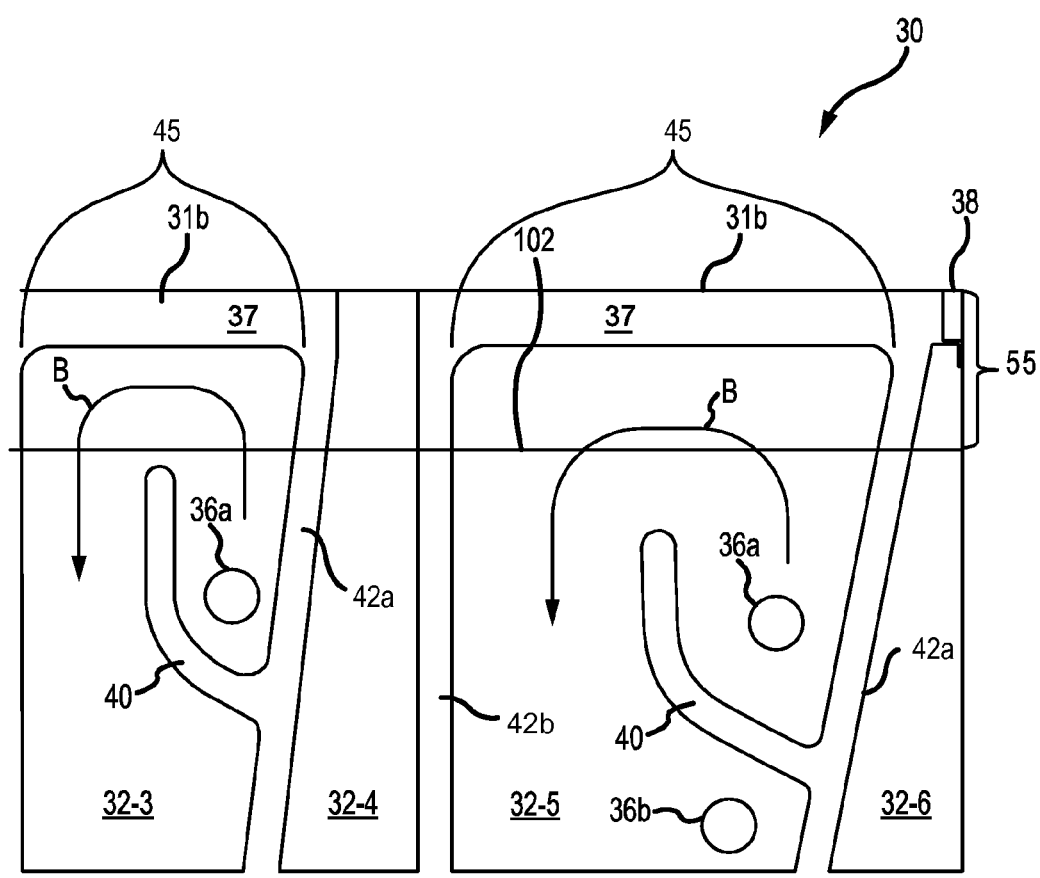
FIG. 7 is an enlarged sectional view of the internal cooling passages 32-3 through 32-6 of FIG. 6, illustrating the elongated rib in internal cooling passages 32-3 and 32-5 directing at least a portion of the coolant (arrow B) from the primary inlet aperture against the first endwall and then substantially reversing direction to flow downstream toward a second end of the respective internal cooling passage, according to various embodiments.

As the operating temperatures of the rotor 12 may exceed the material limits of BOAS segments 30, BOAS segments 30 may include cooling features, such as one or more internal cooling passages 32 (e.g., internal cooling passage of FIG. 5 and internal cooling passages 32-1 through 32-6 of FIG. 6). The one or more internal cooling passages 32 may be configured to receive cooling fluid ("coolant"), such as compressor bleed air 34 (FIG. 1), to cool BOAS segment 30. The one or more internal cooling passages 32 (e.g., 32-1 through 32-6) may extend generally circumferentially from the first axial inter-segment surface 31a to the second axial inter-segment surface 31b and between the radially inner and outer circumferential surfaces 33 and 35 (also known respectively as a "coolant supply surface" and a "seal surface") of BOAS segment 30 so as to be tapered. The shape of the one or more internal cooling passages 32 is generally defined by first and second endwalls 37 and 39 and sidewalls 42a and 42b connecting the first and second endwalls as shown in FIGS. 6 and 7. The first endwall 37 is adjacent the axial inter-segment surface 31b. The second endwall 39 is adjacent the axial inter-segment surface 31a. As depicted in FIG. 6, a plurality of internal cooling passages 32 may be interconnected creating an internal cooling passageway network 60. The first endwall 37 in the depicted BOAS segment 30 comprises a first circumferential endwall and the second endwall 39 in the depicted BOAS segment 30 comprises a second circumferential endwall such that the internal cooling passage(s) are circumferentially-oriented. However, it is to be understood that, in various embodiments, the internal cooling passages may extend in an axial or radial direction between the first endwall and the second endwall (making them other than circumferential endwalls).

During engine operation, the BOAS assembly 20 (FIG. 1) and BOAS segments 30 thereof may be cooled by the compressor bleed air 34 directed to an interior chamber 50 (FIG. 1) of one or more of the BOAS segments 30. The exemplary internal cooling passageway network depicted in FIG. 6 includes the plurality of internal cooling passages extending from the interior chamber 50 (FIG. 1) to a plurality of exit apertures 38. Exemplary exit apertures may include outlets along the inter-segment surfaces 31a and 31b of the BOAS segment 30 (FIG. 6). Internal cooling passageway network 60 provides convection cooling of the perimeter of the BOAS segment and the BOAS assembly.

The one or more internal cooling passages 32 include a primary inlet aperture 36a and may include at least one secondary inlet aperture 36b for purposes as hereinafter described. In accordance with various embodiments, as depicted for example in FIG. 5, the internal cooling passage(s) 32 may include a heat transfer enhancement feature 41 such as at least one of a rib turbulator (a so-called "trip strip"), a pedestal, a pin fin, a dimple/hemispherical protrusion, or the like to provide increased internal convective heat transfer. The trip strip may be in a normal, skewed, segmented, and/or a chevron pattern as shown, for example, in FIG. 5 and hereinafter described. The heat transfer enhancement feature pitch, streamwise spacing, height, pattern, and configuration type may be varied to achieve desired local flow, pressure loss, and cooling channel characteristics (pressure loss, total pressure, static pressure, channel Mach Number, and channel velocity) within the internal cooling passages.

Still referring to FIG. 5 and now to FIGS. 6, 7, and 8A through 8H, according to various embodiments, a selected internal cooling passage of the one or more internal cooling passages 32 may include an elongated rib 40. The depicted internal cooling passage(s) that include the elongated rib 40 are selected because of a unique design challenge due to physical constraints associated with the circumferential location of the hooks 30a and 30b, as well as an axial rail 30c, and circumferential hooks 30d as shown in FIG. 2. The inlet apertures cannot be ideally located adjacent to the inter-segment surfaces 31a and/or 31b (also referred to respectively as a Blade Arrive Edge (BAE) and/or Blade Departure Edge (BDE)). The primary inlet aperture 36a is between the elongated rib 40 and the proximate endwall 37 or 39. The primary inlet aperture 36a is located toward a first end of the internal cooling passage 32. The at least one secondary inlet aperture 36b may be in an overshadowed downstream portion, toward a second end of the selected internal cooling passage as hereinafter described. The elongated rib within the selected internal cooling passage is shaped and sized to minimize flow separation around a U-turn portion 45 of the selected internal cooling passage. The U-turn portion 45 is adjacent the proximate endwall 37 or 39 of the selected internal cooling passage and includes static zone 55 as hereinafter described. While FIGS. 5 through 8H depict the primary inlet aperture 36a, the elongated rib 40, and the U-turn portion 45 proximate the first endwall 37, it is to be understood that they may be located proximate the second endwall 39 depending upon the orientation of the internal cooling passage. Therefore, as used herein, the term "first end" as it relates to internal cooling passage may be proximate the first endwall 37 or the second endwall 39 depending upon the location of the primary inlet aperture 36a. The elongated rib 40 substantially ensures that internal convective cooling is obtained immediately downstream of the primary inlet aperture 36a and around the U-turn portion. The radii R1 and R2 of the elongated rib (see, e.g., FIG. 5) are sufficiently large to accommodate the inlet geometries (i.e., size and shape) of the primary inlet aperture 36a and the at least one secondary inlet aperture 36b so as to minimize internal flow separation. The streamwise length L of the elongated rib may comprise (at least for the shepherd's hook-shaped elongated rib as hereinafter described) a minimum of at least three times the hydraulic diameter (Dh) of the larger of the two adjacent internal cooling passages. The elongated rib is depicted as generally linear, but may be curvilinear, bowed, or have multiple inflections depending upon sidewall 42a and 42b shape and desired circumferential tailoring of internal convection to mitigate external circumferentially varying external gaspath heatload distribution that results from temporal variations induced by upstream combustor and vane count relationships relative to BOAS segments 30.

Referring now more specifically to FIG. 5, according to various embodiments, a selected internal cooling passage 32 is depicted. The selected internal cooling passage includes the elongated rib 40 in the exemplary shape of a shepherd's hook. The elongated rib in FIG. 5 initially extends laterally from the sidewall of the selected internal cooling passage before looping toward the first end (proximate the first endwall 37 in the depicted embodiment) and then toward the opposite second end of the internal cooling passage. The elongated rib in FIG. 5 bisects or segregates the selected internal cooling passage into a first cooling passage 32a and a second cooling passage 32b. Flow in first and second cooling passages 32a and 32b is in communication with each other at pressure balance streamwise locations C where cooling channel characteristics (one or more of pressure loss, total pressure, static pressure, channel Mach Number, and channel velocity) are configured to be substantially balanced (approximately equal) between the cooling passages, i.e., the elongated rib may be continuous and/or segmented with pressure balance/bleed devices or locations C, in order to balance the flow and convective cooling requirements as well as frictional loss and pressure loss requirements in the two adjacent cooling passages 32a and 32b in the streamwise direction to achieve the desired local thermal cooling effectiveness levels. The intent of the pressure balance features is to mitigate potential differences in channel cooling flow, Mn, and total and static pressure distributions between cooling passages 32a and 32b. Depending upon the external axial and circumferential heat flux distribution from the high temperature gaspath flow, the internal convective heat transfer between the cooling passages may be balanced, while in other cases, the back side convective cooling in cooling passages 32a and 32b may be segregated and optimized by inlet supply flow area and optimization of the heat transfer enhancement features 41.

While the exemplary elongated rib 40 depicted in FIG. 5 bisects the selected internal cooling passage 32 to define the first and second cooling passages 32a and 32b, it is to be understood that the elongated rib 40 according to various embodiments may segregate (i.e., sub-divide) the selected internal cooling passage 32 into a fewer or a greater number of cooling passages. The desired segregation is dependent upon heat transfer requirements, refining local cooling requirements within the internal cooling passage, and providing a more distributed flowfield within the selected internal cooling passage. As a result, flow and cooling rates are balanced within the selected internal cooling passage. The depicted internal cooling passage 32 of FIG. 5 further includes one or more of the heat transfer enhancement features 41 as previously described. More specifically, the depicted internal cooling passage 32 of FIG. 5 includes fanned skewed trip strips (41a) around the U-turn portion of the internal cooling passage 32, skewed trip strips (41b) in cooling passage 32b, and segmented chevron trip strips (41c) toward the exit aperture 38 in accordance with various embodiments. While the selected internal cooling passage 32 of FIG. 5 includes a single primary inlet aperture 36a and a pair of secondary inlet apertures 36b, it is to be understood that there may be a fewer or a greater number of secondary inlet apertures depending upon thermal cooling and flow requirements.

Referring now specifically to FIGS. 6 and 7, according to various embodiments, the depicted BOAS segment 30 of FIGS. 2 and 3 is depicted with internal cooling passages 32-1 through 32-6, including selected internal cooling passages 32-3 and 32-5. FIG. 6 is a section of BOAS segment 30 and FIG. 7 is a close-up view of the dotted line portion of FIG. 6. Internal cooling passages 32-1 and 32-6 include one or more inlet apertures 36 inclusive of the primary inlet aperture 36a and the at least one secondary inlet aperture 36b, one or more exit apertures 38. Inlet apertures 36 (including primary inlet aperture 36a and secondary inlet aperture 36b) are in fluid communication with a coolant supply, such as compressor bleed air 34 shown in FIG. 1. Primary inlet aperture 36a is in fluid communication with the first end of internal cooling passage 32. Primary inlet aperture 36a may be arranged toward a longitudinal center of internal cooling passage 32 as shown in FIG. 8C through 8E and 8G. In various embodiments, primary inlet aperture 36a may be offset from center as shown in FIGS. 6 and 7 and FIGS. 8A, 8B, and 8F. Exit aperture 38 may be in fluid communication with a second end of internal cooling passage 32 and, for example, a space between circumferentially adjacent BOAS segments 30. The number of secondary inlet apertures may be increased or decreased from that depicted in FIGS. 8A through 8E and 8G.

During engine operation, each BOAS segment 30 may be cooled using, for example, compressor bleed air 34 directed to BOAS segment 30 through supports 22, 24 (FIG. 1). Some of compressor bleed air 34 may enter each of internal cooling passages 32 through inlet apertures 36 (including primary inlet aperture 36a and the at least one secondary inlet aperture 36b), flow through internal cooling passage 32, and exit through cooling exit aperture 38 to cool internal cooling passage first and second endwalls 37 and 39 adjacent inter-segment surfaces 31a and 31b of adjacent BOAS segments 30. In various embodiments, improved cooling of the internal cooling passage first endwall 37 adjacent inter-segment surface 31b or the second endwall 39 adjacent inter-segment surface 31a and the primary inlet aperture 36a may be achieved. The first and/or second endwalls 37 and 39 of internal cooling passage may experience increased thermal loads.

Referring again to FIGS. 4 and 7, various embodiments employ the elongated rib 40 to direct fluid flow to static zones 55 (also referred to as "hidden zones") of the internal cooling passages and to the proximate endwall 37 or 39 adjacent the axial inter-segment surfaces. The elongated rib 40 forces the flow to fluidly communicate with the proximate endwall 37 or 39 proximate the primary inlet aperture 36a and then substantially reverse direction (i.e., to make a U-turn) toward the opposite second end of the internal cooling passage. As used herein, the term "substantially reverse direction" means that the elongated rib in various embodiments may turn the flow about 180 degrees, but it is also to be understood that various embodiments may "substantially reverse direction" of the flow toward the second end of the internal cooling passage but at an angle from as high as 270 degrees to as low as 90 degrees. The elongated rib 40 forces the coolant flow into the internal cooling passage static zone that is between the primary inlet aperture 36a and the proximate endwall 37 or 39 adjacent the axial inter-segment surface where adjacent BOAS segments adjoin. The elongated rib improves cooling of the internal cooling passage endwalls 37 and 39 adjacent the axial inter-segment surfaces 31*b* and 31*a*.

Still referring to FIGS. 5, 6, 7 and FIGS. 8A through 8H, according to various embodiments, the elongated rib 40 is arranged inside selected internal cooling passage(s) 32 between primary inlet aperture 36*a* and the second end of internal cooling passage(s) 32. In various embodiments, the elongated rib may partially extend from a first sidewall 42*a* of a selected internal cooling passage toward an opposite second sidewall 42*b* thereof (i.e., the elongated rib is connected to one of the sidewalls of the selected internal cooling passage). In various embodiments, the elongated rib is isolated inside the internal cooling passage (i.e., not connected to either sidewall of the selected internal cooling passage). The elongated rib has or defines a concave surface portion that faces the primary inlet aperture 36*a* and the proximate endwall adjacent the inter-segment surfaces of adjoining BOAS segments. The elongated rib may be segmented with a plurality of rib segments collectively forming the elongated rib. The plurality of rib segments may comprise a rib segment arranged on each side of a longitudinal center of the internal cooling passage. While FIGS. 6 and 7 illustrate an elongated rib inside only two of the six internal cooling passages in the depicted BOAS segment 30, internal cooling passage 32-3 and internal cooling passage 32-5, it is to be understood that the elongated rib may be inside a fewer or a greater number of internal cooling passages, and in other than the depicted internal cooling passages as shown. The elongated rib is included inside selected internal cooling passages (such as internal cooling passages 32-3 and 32-5) in which the shiplap joint 100 (such as depicted in FIG. 4) and/or feather seal slot edge 102 (FIG. 7) substantially prevents placement of the primary inlet aperture 36*a* adjacent the internal cooling passage endwall 37 or 39 adjacent the inter-segment surfaces. For example, referring now specifically to FIG. 6, the inlet apertures in internal cooling passage 32-1 are located at an aft position, making the inlet apertures 36 inside internal cooling passage 32-1 close to a sidewall of the internal cooling passage. The inlet apertures 36 are located in close proximity to the second endwall 39 in internal cooling passages 32-4 and 32-6. Therefore, internal cooling passages 32-1 and 32-4 and 32-6 may not include the elongated rib 40 for improving cooling of the first endwall 37 adjacent the inter-segment surfaces. On the other hand, for internal cooling passages 32-3 and 32-5, the shiplap joint 100 of FIG. 4 and/or feather seal slot 102 of FIG. 7 adjacent the inter-segment surfaces of the circumferentially adjacent BOAS segments 30 prevents the primary inlet aperture from being adjacent the first endwall 37 and benefits from having the primary inlet apertures 36*a* in each of internal cooling passage 32-3 and 32-5 be shifted away from the respective first or second endwall. For example, primary inlet aperture 36*a* in internal cooling passage 32-5 is in close proximity relative to the first end of internal cooling passage 32-5 without interfering with the feather seal slot edge 102 depicted there. As the primary inlet apertures 36*a* in exemplary internal cooling passage 32-3 and 32-5 are away from the first endwall 37 that is to be cooled, the elongated rib 40 in each of internal cooling passages 32-3 and 32-5 forces the respective first endwall 37 thereof to be in fluid communication with at least a portion of the coolant (in the static or hidden zone 55 defined between the primary inlet aperture and the first endwall) before substantially reversing direction toward the opposite second end of respectively internal cooling passage 32-3 and 32-5 and the respective exit aperture 38.

The size and shape of the elongated rib 40 may vary in various embodiments. For example, FIGS. 8A through 8H schematically illustrate various embodiments including elongated ribs of various shapes inside internal cooling passage 32. As noted previously, internal cooling passage 32 may be segregated as shown into two or more cooling passages.

Figure 8A:
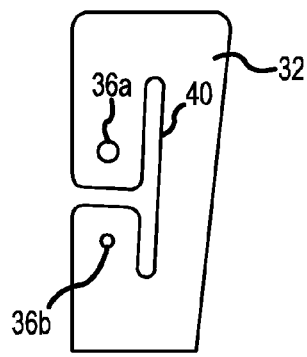
FIGS. 8A through 8H are schematic views of various embodiments including elongated ribs of various shapes and sizes proximate to a primary inlet aperture with and without one or more secondary inlet apertures.

In FIG. 8A, internal cooling passage 32 includes an elongated rib comprising a generally T-shaped rib that extends into the internal cooling passage from a sidewall thereof. The primary inlet aperture 36*a* is between the elongated rib and the first endwall 37. The secondary inlet aperture 36*b* is inside the internal cooling passage, in an overshadowed downstream portion thereof. As used herein, the overshadowed downstream portion of the internal cooling passage is the portion of the internal cooling passage that is downstream from the elongated rib and is in the shadow of the elongated rib.

Figure 8B:
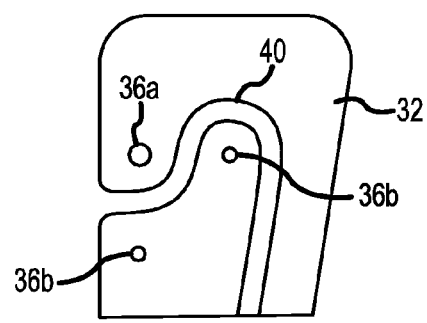

In FIG. 8B (that illustrates a portion of the internal cooling passage 32 of FIG. 5), the internal cooling passage includes the elongated rib 40 that extends generally laterally into the internal cooling passage from a sidewall thereof before looping toward the first end and then the second end of internal cooling passage 32. Primary inlet aperture 36*a* in FIG. 8B is between the elongated rib and the first endwall 37. Secondary inlet apertures 36*b* are in the overshadowed downstream portions of the internal cooling passage as hereinafter described.

Figure 8C:
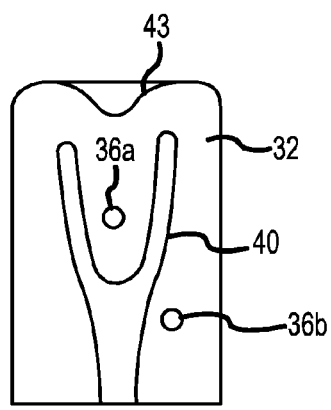
Figure 8D:
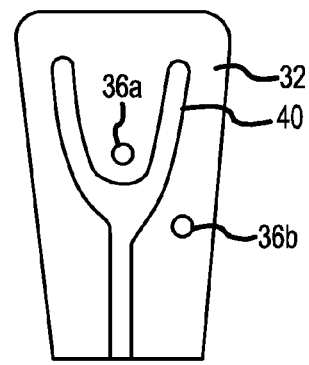

In FIGS. 8C and 8D, internal cooling passage 32 includes the elongated rib 40 isolated from the sidewalls of the internal cooling passage. The elongated rib is generally Y-shaped. The primary inlet aperture is disposed between the elongated rib and the endwall. The secondary inlet apertures 36*b* are disposed in the overshadowed downstream portions of each internal cooling passage as hereinafter described. The first endwall 37 in FIG. 8C includes a protrusion 43 extending from the first endwall into the internal cooling passage. The protrusion brings the first endwall closer to the primary inlet aperture 36*a*. The protrusion 43 splits the flow between the cooling passages, helps smooth the transition from the primary inlet aperture 36*a* to the individual cooling passages, and helps maintain a more consistent flow area around the U-turn portion. The trunk of the generally Y-shaped elongated rib is relatively thick, taking up more space between the sidewalls in the internal cooling passage of FIG. 8C as compared with the generally Y-shaped elongated rib of FIG. 8D. The thicker elongated rib provides more conduction and reduces the convective surface area.

Figure 8E:
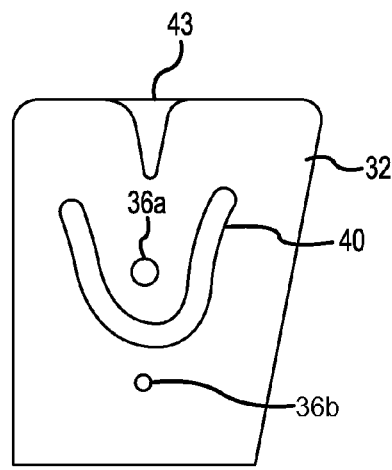

In FIG. 8E, the internal cooling passage 32 includes an elongated rib 40 comprising a generally U-shaped rib. A concave surface portion of the generally U-shaped rib faces the primary inlet aperture 36*a*. The convex side of the generally U-shaped rib faces the secondary inlet aperture 36*b*. The first endwall in FIG. 8E includes the protrusion 43 extending partially into the internal cooling passage.

Figure 8F:
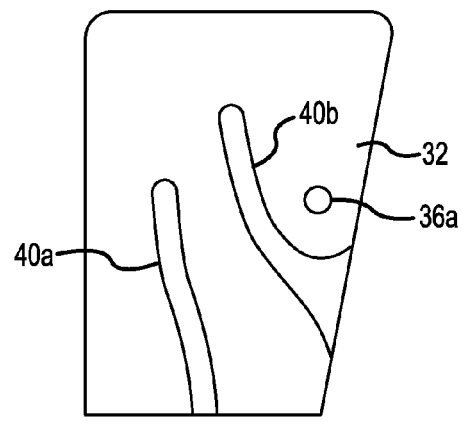
Figure 8G:
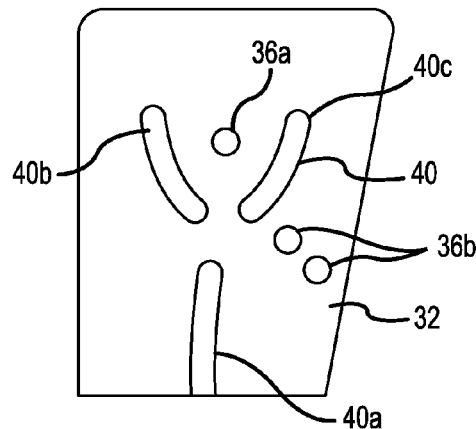
Figure 8H:
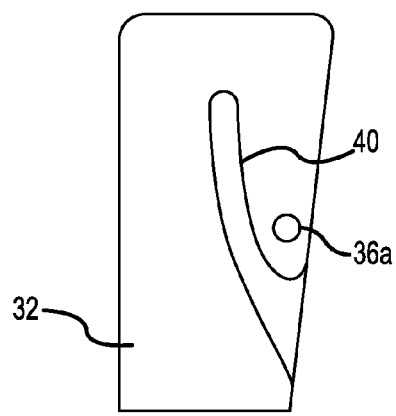

In FIG. 8F, the elongated rib 40 comprises a segmented rib, with a first rib segment 40*a* partially extending from the second endwall at the second end and a second rib segment 40*b* partially extending from a sidewall of the internal cooling passage. In FIG. 8G, the elongated rib 40 comprises a segmented rib with a first rib segment 40*a* partially extending from the internal cooling passage second endwall 39 at the second end. An isolated second rib segment 40*b* and an isolated third rib segment 40*c* collectively form, along with the first rib segment 40*a*, a segmented generally Y-shaped elongated rib. The concave surface portion defined by the segmented generally Y-shaped elongated rib faces the first endwall 37 of the internal cooling passage. The primary inlet aperture 36a is between the first and second rib segments and the first endwall 37 at the first end of the internal cooling passage and the secondary inlet apertures 36b are depicted in an overshadowed downstream portion of the internal cooling passage as hereinafter described. FIG. 8H (similar to FIGS. 6 and 7) depicts the elongated rib 40 partially extending into the internal cooling passage from a sidewall of the internal cooling passage. The elongated rib defines a concave surface portion that faces the first endwall. The primary inlet aperture 36a is between the elongated rib and the first endwall. In each example, the primary inlet aperture 36a is proximate the elongated rib, closer to the elongated rib than the first endwall. In addition, the elongated rib, segments, or portions thereof are elongated relative to the size of the primary inlet aperture 36a, permitting the coolant to be redirected relative to the input direction (i.e., substantially make a U-turn) in the internal cooling passage 32.

To improve cooling downstream of (primary) inlet aperture, more specifically in the portion of the internal cooling passage 32 overshadowed by the elongated rib 40 (the "overshadowed downstream portion"), the internal cooling passage 32 may also include the at least one secondary inlet aperture 36b (as depicted in FIGS. 5, 8A through 8E, and 8G) as described above) that may act to increase fluid flow and thereby cooling in regions downstream of the elongated rib 40. Without the secondary inlet aperture 36b, the cooling flow may recirculate in regions downstream of the primary inlet aperture 36a without providing active cooling. The secondary inlet aperture 36b is in fluid communication with the coolant supply and internal cooling passage 32. As shown in FIGS. 8A, 8B, and 8E, the at least one secondary inlet aperture 36b is inside the internal cooling passage 32 between elongated rib 40 and the second end of the internal cooling passage (FIGS. 8A through 8H depict only the first end portion of the internal cooling passage).

The shape and size of the elongated rib utilized is predicated on a number of mechanical, structural, and geometric constraints, as well as the thermal performance objectives and is thus largely application dependent. A shape of the primary inlet aperture and the at least one secondary inlet aperture is configured to meet a convective heat transfer requirement. A size of the primary inlet aperture is configured to provide a predetermined flow rate and convective heat transfer rate within the internal cooling passage. The first radii (R1) and the second radii (R2) size (e.g., FIG. 5) of the elongated rib is configured to minimize flow separation in the internal cooling passage and to accommodate the shape and size of the primary inlet aperture and the at least one secondary inlet aperture. While cylindrical or circular inlet apertures 36a and 36b are depicted in FIGS. 5 through 8H, it is to be understood that the primary inlet aperture and/or the at least one secondary inlet aperture may be any shape necessary to achieve the channel flow cooling fill and inlet loss characteristics needed for internal convective heat transfer. For example, exemplary inlet aperture shapes may include oval, elliptical, elongated slot(s), and teardrop shapes. The primary inlet aperture and the at least one secondary inlet aperture are sized to substantially ensure that one or more of the pressure loss, total pressure, static pressure, channel Mach Number, and channel velocity (exemplary cooling channel characteristics) between cooling passages 32a and 32b are substantially balanced (approximately equal) at the streamwise locations C where passage flows in cooling passages 32a and 32b are in communication with each other.

Various embodiments of the present disclosure have several advantages over conventional designs. Various embodiments increase the effectiveness of selected internal cooling passages in BOAS segments by employing the elongated rib to direct cooling fluid flow from the primary inlet aperture to the proximate endwall of the internal cooling passage, the endwall adjacent the axial inter-segment surfaces where adjacent BOAS segments adjoin and thereby increase cooling in previously inadequately cooled regions (i.e., in the static or hidden zones 55 of the selected internal cooling passages (see FIG. 7)) of the BOAS segment. Additionally, various embodiments may include the at least one secondary inlet aperture configured to increase cooling in the selected internal cooling passage downstream of the elongated rib. Cooling is particularly increased toward the proximate endwall adjacent the inter-segment surface, which surface is susceptible to high thermal loads from hot working medium gas ingested into the junction between adjacent BOAS segments. Increased cooling according to the various embodiments reduces the risk of material failures due to thermo-mechanical stress on the BOAS assemblies and segments and generally increases engine operating efficiency, both of which reduce costs associated with operating and maintaining the gas turbine engine.

While various embodiments have been described and illustrated with respect to blade outer air seal (BOAS) assemblies and segments in turbines, it is to be understood that various embodiments may be used to improve cooling of other gas turbine engine components with convectively-cooled internal cooling passages. For example, various embodiments may be used for improved cooling of a vane platform with convectively-cooled internal cooling passages. In accordance with various embodiments, the gas turbine engine component comprises an internal cooling passage having the first endwall and the second endwall. The primary inlet aperture is in fluid communication with a coolant supply and the first end of the internal cooling passage. The elongated rib is inside the internal cooling passage and proximate the primary inlet aperture. The elongated rib is configured to direct at least a portion of the coolant from the primary inlet aperture against a proximate one of the first endwall or the second endwall and then substantially reverse direction to flow downstream toward a second end of the internal cooling passage. As noted previously, while internal cooling passages that extend circumferentially between the first endwall and the second endwall have been described for BOAS assembly 20 and BOAS segment 30, it is to be understood that internal cooling passage(s) in a BOAS assembly, BOAS segment, or other gas turbine engine component may axially or radially extend between the first endwall and the second endwall. It is also to be understood that the other gas turbine engine components may include internal cooling passages that extend circumferentially in the same manner as in the depicted BOAS assembly/BOAS segment. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine component comprising:
   an internal cooling passage having a first endwall and a second endwall;
   a primary inlet aperture in fluid communication with a coolant supply and a first end of the internal cooling passage; and
   an elongated rib inside the internal cooling passage and proximate the primary inlet aperture, the elongated rib configured to direct at least a portion of the coolant from the primary inlet aperture against a proximate one of the first endwall or the second endwall and then substantially reverse direction to flow downstream toward a second end of the internal cooling passage, wherein the elongated rib at least partially segregates the internal cooling passage into two or more cooling passages that communicate at one or more streamwise pressure locations.

2. The gas turbine engine component of claim 1, wherein the internal cooling passage comprises a first sidewall and a second sidewall and the first endwall and the second endwall connect the first sidewall and the second sidewall, and wherein the elongated rib is connected to and partially extending from at least one of the first sidewall or the second sidewall toward another of the first sidewall or the second sidewall.

3. The gas turbine engine component of claim 1, wherein the elongated rib is isolated inside the internal cooling passage.

4. The gas turbine engine component of claim 1, wherein the elongated rib comprises at least one of a generally L-shaped rib, a generally T-shaped rib, a generally Y-shaped rib, a generally U-shaped rib, or a shepherd's hook-shaped rib.

5. The gas turbine engine component of claim 1, wherein the elongated rib overshadows a downstream portion of the internal cooling passage, the downstream portion of the internal cooling passage overshadowed by the elongated rib including at least one secondary inlet aperture in fluid communication with the coolant supply and the internal cooling passage, wherein the elongated rib is disposed between the primary inlet aperture and a secondary inlet aperture of the at least one secondary inlet aperture.

6. The gas turbine engine component of claim 1, wherein the internal cooling passage further comprises one or more heat transfer enhancement features.

7. The gas turbine engine component of claim 5, wherein a shape of the primary inlet aperture and the at least one secondary inlet aperture is configured to meet a convective heat transfer requirement, a size of the primary inlet aperture is configured to provide a predetermined flow rate and convective heat transfer rate within the internal cooling passage, and a first radii (R1) and a second radii (R2) size of the elongated rib is configured to minimize flow separation in the internal cooling passage and to accommodate a shape and a size of the primary inlet aperture and the at least one secondary inlet aperture.

8. The gas turbine engine component of claim 1, wherein the elongated rib comprises at least one of a linear rib, a curvilinear rib, a bowed rib, or a rib having multiple inflections.

9. A BOAS segment in a gas turbine engine, the BOAS segment comprising:
   a coolant supply surface configured to be in fluid communication with a coolant supply;
   a seal surface configured to be in fluid communication with a working medium fluid flow and arranged radially outward of a plurality of turbine blades;
   a first inter-segment surface extending between the coolant supply surface and the seal surface;
   a second inter-segment surface circumferentially offset from the first inter-segment surface and extending between the coolant supply surface and the seal surface; and
   an internal cooling passage between the coolant supply surface and the seal surface and extending between the first and the second inter-segment surfaces so as to be tapered, wherein a selected internal cooling passage comprises:
      a primary inlet aperture in fluid communication with the coolant supply and a first end of the internal cooling passage; and
      an elongated rib inside the internal cooling passage and proximate the primary inlet aperture, the elongated rib configured to direct at least a portion of the coolant from the primary inlet aperture against a proximate one of the first endwall or the second endwall and then substantially reverse direction to flow downstream toward a second end of the internal cooling passage, wherein the elongated rib at least partially segregates the internal cooling passage into two or more cooling passages that communicate at one or more streamwise pressure locations where one or more channel cooling characteristics are configured to be substantially balanced.

10. The BOAS segment of claim 9, wherein the internal cooling passage comprises a first sidewall and a second sidewall and the first endwall and a second endwall connect the first sidewall and the second sidewall, and the elongated rib is connected to and partially extends from at least one of the first sidewall or the second sidewall toward another of the first sidewall or the second sidewall.

11. The BOAS segment of claim 9, wherein the elongated rib is isolated inside the internal cooling passage.

12. The BOAS segment of claim 9, wherein the elongated rib comprises at least one of a generally L-shaped rib, a generally T-shaped rib, a generally Y-shaped rib, a generally U-shaped rib, or a shepherd's hook-shaped rib.

13. The BOAS segment of claim 9, wherein the elongated rib overshadows a downstream portion of the internal cooling passage, the downstream portion of the internal cooling passage overshadowed by the elongated rib including at least one secondary inlet aperture in fluid communication with the coolant supply and the internal cooling passage, wherein the elongated rib is disposed between the primary inlet aperture and a secondary inlet aperture of the at least one secondary inlet aperture.

14. The BOAS segment of claim 13, wherein a shape of the primary inlet aperture and the at least one secondary inlet aperture is configured to meet a convective heat transfer requirement, a size of the primary inlet aperture is configured to provide a predetermined flow rate and convective heat transfer rate within the internal cooling passage, and a first radii (R1) and a second radii (R2) size of the elongated rib is configured to minimize flow separation in the internal cooling passage and to accommodate a shape and a size of the primary inlet aperture and the at least one secondary inlet aperture.

15. The BOAS segment of claim 9, wherein a streamwise length (L) of the elongated rib comprising a shepherd's hook-shaped rib comprises a minimum of at least three times a hydraulic diameter of the larger of two adjacent cooling passages of the two or more cooling passages.

16. A blade outer air seal (BOAS) assembly comprising:
a plurality of circumferentially extending and adjoined BOAS segments, each BOAS segment comprising:
a first inter-segment surface and a second inter-segment surface connecting an outer diameter face and an inner diameter face;
a plurality of internal cooling passages extending between the first inter-segment surface and the second inter-segment surface and between the outer diameter face and the inner diameter face, each internal cooling passage having a first endwall and a second endwall, at least one internal cooling passage of the plurality of internal cooling passages comprising:
a primary inlet aperture in fluid communication with a coolant supply and a first end of the at least one internal cooling passage; and
an elongated rib proximate the primary inlet aperture and comprising an elongated rib configured to direct at least a portion of the coolant from the inlet aperture against the a proximate one of the first endwall or second endwall and then substantially reverse direction to flow downstream toward a second end of the at least one internal cooling passage, wherein the elongated rib at least partially segregates the at least one internal cooling passage into two or more cooling passages that communicate at one or more streamwise pressure locations.

17. The BOAS assembly of claim 16, wherein the elongated rib is connected to and partially extends from at least one of a first sidewall or a second sidewall toward another of the first sidewall or the second sidewall of the at least one internal cooling passage or is isolated inside the internal cooling passage, the primary inlet aperture between the proximate one of the first endwall or the second endwall and the elongated rib.

18. The BOAS assembly of claim 16, wherein the elongated rib has or defines a concave surface portion that faces the primary inlet aperture and the proximate one of the first endwall or the second endwall, the elongated rib comprising at least one of a generally L-shaped rib, a generally T-shaped rib, a generally Y-shaped rib, a generally U-shaped rib, or a shepherd's hook-shaped rib.

* * * * *